(12) United States Patent
Etter et al.

(10) Patent No.: US 9,825,961 B2
(45) Date of Patent: Nov. 21, 2017

(54) METHOD AND APPARATUS FOR ASSIGNING DEVICES TO A MEDIA SERVICE

(71) Applicant: THOMSON LICENSING, Issy de Moulineaux (FR)

(72) Inventors: Michael Etter, Portland, CA (US); Greg Alan Martin, Portland, OR (US); Noah Dijulio, Portland, OR (US); Ryan Cameron Coulter, Portland, OR (US); Laura J. O'Donnell, Hermosa Beach, CA (US); Roger Yeh, San Marino, CA (US); Edwin Curmie Price, Long Beach, CA (US); Ray Edward Starck, West Hollywood, CA (US)

(73) Assignee: Thomson Licensing (FR)

( * ) Notice: Subject to any disclaimer, the term of this patent is extended or adjusted under 35 U.S.C. 154(b) by 88 days.

(21) Appl. No.: 14/774,606

(22) PCT Filed: Jun. 26, 2013

(86) PCT No.: PCT/US2013/047987
§ 371 (c)(1),
(2) Date: Sep. 10, 2015

(87) PCT Pub. No.: WO2014/099012
PCT Pub. Date: Jun. 26, 2014

(65) Prior Publication Data
US 2016/0050212 A1    Feb. 18, 2016

Related U.S. Application Data

(60) Provisional application No. 61/738,340, filed on Dec. 17, 2012.

(51) Int. Cl.
*G06F 21/62* (2013.01)
*H04L 29/06* (2006.01)
(Continued)

(52) U.S. Cl.
CPC ........ *H04L 63/102* (2013.01); *G06F 3/04847* (2013.01); *G06F 21/10* (2013.01);
(Continued)

(58) Field of Classification Search
CPC ... H04L 63/102; G06F 21/629; G06F 21/6218
See application file for complete search history.

(56) References Cited

U.S. PATENT DOCUMENTS

7,707,613 B1    4/2010    Wugofski et al.
8,341,717 B1    12/2012   Delker et al.
(Continued)

*Primary Examiner* — David Pearson
(74) *Attorney, Agent, or Firm* — Jack Schwartz & Associates, PLLC (57) ABSTRACT

A user interface is used to assign different devices and device types to media services where the number of different devices and device types that are capable of being assigned is determined by access privilege information corresponding to such media services. When a number of devices of a specific type are assigned where such a number exceeds a limit specified in the access privilege information, the assignment of additional devices of that specific type is halted.

28 Claims, 11 Drawing Sheets

(51) Int. Cl.
*G06F 21/10* (2013.01)
*G06F 3/0484* (2013.01)

(52) U.S. Cl.
CPC ............ *G06F 21/629* (2013.01); *H04L 63/10* (2013.01); *H04L 63/20* (2013.01)

(56) References Cited

U.S. PATENT DOCUMENTS

| | | |
|---|---|---|
| 2004/0143840 A1 | 7/2004 | Fukuda et al. |
| 2005/0160042 A1 | 7/2005 | Russell et al. |
| 2007/0039039 A1 | 2/2007 | Gilbert et al. |
| 2007/0094145 A1* | 4/2007 | Ta .................. G06F 21/105 705/59 |
| 2008/0320560 A1* | 12/2008 | Casey ................ H04L 63/10 726/3 |
| 2009/0017790 A1 | 1/2009 | Thalapaneni et al. |
| 2010/0031299 A1* | 2/2010 | Harrang ............ H04N 21/4104 725/80 |
| 2010/0107225 A1 | 4/2010 | Spencer et al. |
| 2011/0191859 A1* | 8/2011 | Naslund ............ G06F 21/10 726/27 |
| 2012/0079601 A1* | 3/2012 | Gava ................ G06F 21/10 726/26 |

\* cited by examiner

METHOD AND APPARATUS FOR ASSIGNING DEVICES TO A MEDIA SERVICE

This application claims the benefit, under 35 U.S.C. & 365 of International Application No. PCT/US2013/047987, filed on Jun. 26, 2013, which was published in accordance with PCT Article 21(2) on Jun. 26, 2014 in English and which claims the benefit of U.S. Provisional Patent Application No. 61/738,340, filed Dec. 17, 2012.

TECHNICAL FIELD

The present disclosure generally relates to a user interface for displaying representations of different devices. More particularly, the present disclosure relates to a method and apparatus for assigning devices to a media service using such representations.

BACKGROUND OF THE DISCLOSURE

When using a media service, a user has an account associated with the media service that provides a user with the ability to consume content from such a media service using different media devices such as a computer, tablet, phone, set top box, and the like. Many media services will not restrict a user from consuming content on any device as long as a user has the proper account information to access such a media service.

There can be a problem when a user shares account information with other people who are not compensating the media service operator for such access. Alternatively, an approach of letting only one device per account access a media service at a time is not a good solution for this multiple access problem because a user may want other family members to access a media service at the same time or the user may want to access such a media service using multiple devices at the same time.

SUMMARY OF THE INVENTION

A method and apparatus is presented that provides a user interface that is used for assigning one or more devices to media service(s). Access privilege information corresponding to a media service is used for determining how many devices of a specific type can be assigned to the media service. Then in response to a user instruction, such devices are assigned to the media service until a limit is reached which halts the further assignment of devices to the media service.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

In the drawings, wherein like reference numerals denote similar elements throughout the views.

DETAILED DESCRIPTION

The present disclosure provides several different embodiments of a user interface that is used for assigning a number of devices to a media service such as, M-GO, NETFLIX, AMAZON VIDEO, and the like to a number of device, so such a media service can be used on such devices. Such a user interface and the components for assigning a device to a media service can be implemented on devices such as a computer, set top box, media server, tablet, mobile phone, personal media device, portable video game system, video game system, and so forth.

Figure 1:
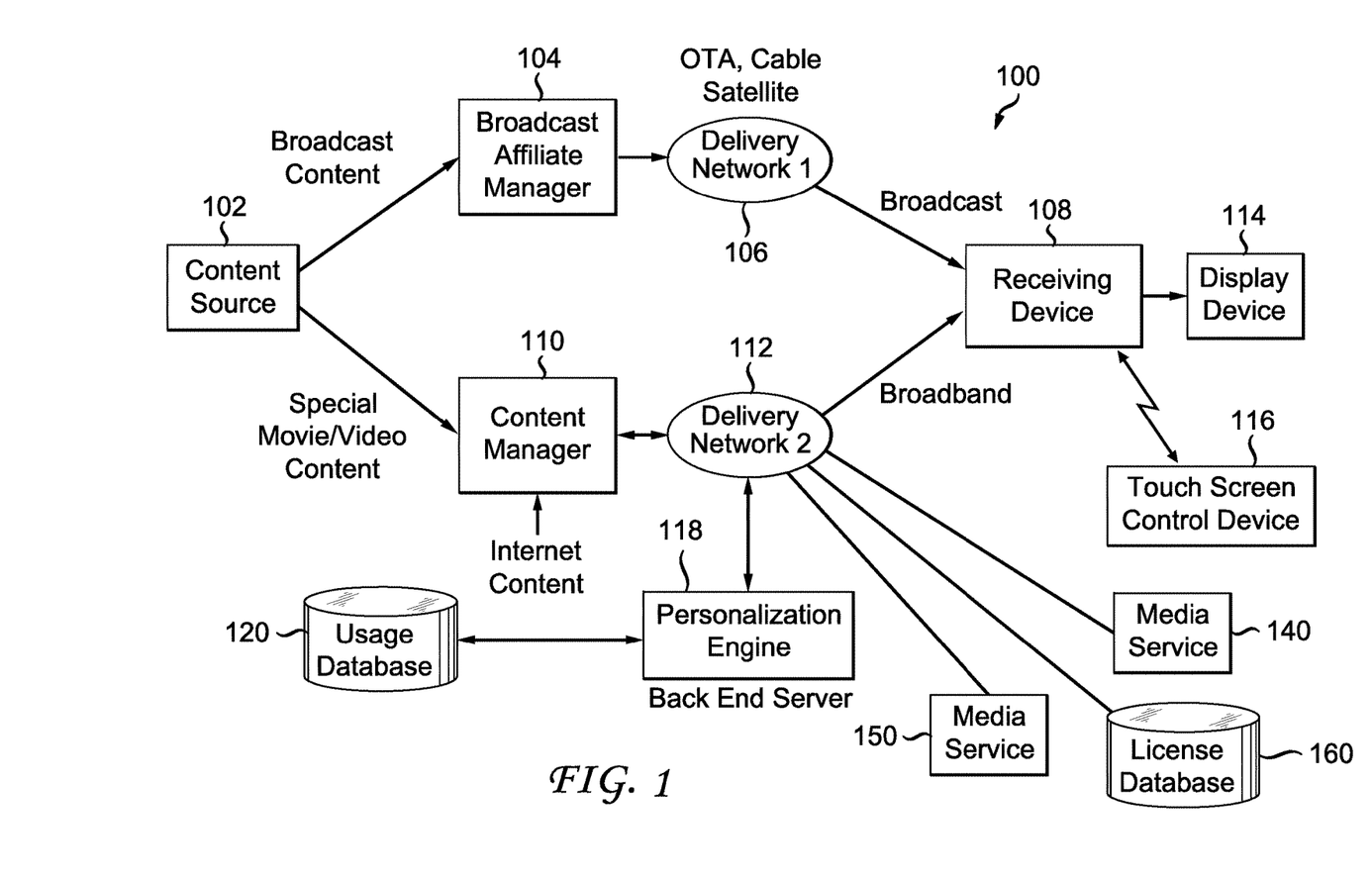
FIG. 1 is a block diagram of an exemplary system for delivering video content in accordance with the present disclosure.

Turning now to FIG. 1, a block diagram of an embodiment of a system 100 for delivering content to a home or end user is shown. The content originates from a content source 102, such as a movie studio or production house. The content may be supplied in at least one of two forms. One form may be a broadcast form of content. The broadcast content is provided to the broadcast affiliate manager 104, which is typically a national broadcast service, such as the American Broadcasting Company (ABC), National Broadcasting Company (NBC), Columbia Broadcasting System (CBS), etc. The broadcast affiliate manager may collect and store the content, and may schedule delivery of the content over a deliver network, shown as delivery network 1 (106). Delivery network 1 (106) may include satellite link transmission from a national center to one or more regional or local centers. Delivery network 1 (106) may also include local content delivery using local delivery systems such as over the air broadcast, satellite broadcast, or cable broadcast. The locally delivered content is provided to a media device 108 in a user's home, where the content will subsequently be searched by the user. It is to be appreciated that the media device 108 can take many forms and may be embodied as a set top box/digital video recorder (DVR), a gateway, a modem, etc. Further, the media device 108 may act as entry point, or gateway, for a home network system that includes additional devices configured as either client or peer devices in the home network.

A second form of content is referred to as special content. Special content may include content delivered as premium viewing, pay-per-view, video on demand, or other content otherwise not provided to the broadcast affiliate manager, such as movies, video games, applications, and other video elements. In many cases, the special content may be content requested by the user. The special content may be delivered to a content manager 110. The content manager 110 can be a service provider, such as an Internet website, affiliated, for instance, with a content provider, broadcast service, or delivery network service. The content manager 110 may also incorporate Internet content into the delivery system.

The content manager 110 may deliver the content to the user's media device 108 over a delivery network 2 (112). Delivery network 2 (112) may include high-speed broadband Internet type communications systems. It is important to note that the content from the broadcast affiliate manager 104 may also be delivered using all or parts of delivery network 2 (112) and content from the content manager 110 may be delivered using all or parts of delivery network 1 (106). In addition, the user may also obtain content directly from the Internet via delivery network 2 (112) without necessarily having the content managed by the content manager 110.

Several adaptations for utilizing the separately delivered content may be possible. In one possible approach, the special content is provided as an augmentation to the broadcast content, providing alternative displays, purchase and merchandising options, enhancement material, etc. In another embodiment, the special content may completely replace some programming content provided as broadcast content. Finally, the special content may be completely separate from the broadcast content, and may simply be a media alternative that the user may choose to utilize. For instance, the special content may be a library of movies that are not yet available as broadcast content.

The media device 108, as a consumption device, can receive different types of content from one or both of delivery network 1 and delivery network 2. The media device 108 processes the content, and provides a separation of the content based on user preferences and commands. The media device 108 may also include a storage device, such as a hard drive or optical disk drive, for recording and playing back audio and video content. Further details of the operation of the media device 108 and features associated with playing back stored content will be described below in relation to FIG. 2. The processed content is provided to a display device 114. The display device 114 may be a conventional 2-D type display or may alternatively be an advanced 3-D display.

The media device 108 may also be interfaced to a second screen such as a touch screen control device 116. The touch screen control device 116 may be adapted to provide user control for the media device 108 and/or the display device 114. The touch screen device 116 may also be capable of displaying video content. The video content may be graphics entries, such as user interface entries, or may be a portion of the video content that is delivered to the display device 114 The touch screen control device 116 may interface to media device 108 using any well known signal transmission system, such as infra-red (IR) or radio frequency (RF) communications and may include standard protocols such as infra-red data association (IRDA) standard, Wi-Fi, Bluetooth and the like, or any other proprietary protocols. Operations of touch screen control device 116 will be described in further detail below.

Optionally, media device 108 and touch screen control device 116 can be integrated into the same device. Examples of these media devices with a touch screen include computers, laptops, cell phones, personal media player, MP3 players, personal desk assistants, tablet devices, digital video recorders, and the like. For purposes of the this specification, the term media device 108 can encompass all of these type of devices with set top boxes, digital video recorders, gateway devices, and the like.

In the example of FIG. 1, the system 100 also includes a back end server 118 and a usage database 120. The back end server 118 includes a personalization engine that analyzes the usage habits of a user and makes recommendations based on those usage habits. The usage database 120 is where the usage habits for a user are monitored and information about such usage habits is stored. It is possible to use such user habit information to develop a profile for a user which is then used for recommending advertisements and programming. In some cases, the usage database 120 may be part of the back end server 118. In the present example, the back end server 118 (as well as the usage database 120) is connected to the system the system 100 and accessed through the delivery network 2 (112).

Media services 140 and 150 represent media service providers such as M-GO, NETFLIX, AMAZON MEDIA SERVICES, and the like that deliver media content such as videos, audio, computer programs, and the like to receiving device 108 or a plurality of receiving devices (108). Media services 140 and 150 can be delivered in the form of Internet Protocol (IP) packets that are from an over the top (OTT) service where an OTT service is independent and not controlled by a service provider. Alternatively, media services 140 and 150 can also be implemented as having a service provider such as COMCAST, TIME-WARNER CABLE, VERIZON FIOS, and the like which delivers media content in the form of a video on demand service, application store, downloadable video, among other implementations.

License database 160 can be implemented on a server, computer, or other device, where database 160 keeps track of the access privileges that a user has for a media service 140, 150. Specifically, when a user has an account with a media service 140, 150, the license database 160 maintains how many devices 108 of different types that a user can use with a media service 140, 150 for a specific user account pertaining to that user. Different device types include computer, tablet, video game system, smart phone, set top box, television, and the like. For example, an access privilege for a user for a corresponding media service 140, 150 limits the use of only one smartphone and two tablets for a user's account, although other variations of this example in accordance with the principles of the invention. The information composing access privileges can be implemented using metadata, data keys, encrypted information, and the like.

TABLE 1 below gives different examples of how access privileges can be implemented for various media services, device type restrictions, floating accounts, and the like. The user column corresponds to a particular user. The media service column corresponds to a media service being used. The "#" of "device type" column lists the devices that can be assigned to a media service where the listed number is the limit of such device types.

The column for "# FLOATING" corresponds to a floating account where the license will not depend on a device type, rather the floating account is a generic assignment that can be made to any device. For example, for User 1 when using M-GO, the user can assign one computer, one tablet, one smartphone, two televisions, and one generic account "floating" which can be assigned to any device type. Hence, by using the floating account in the present example, a user can have two tablets be assigned to M-GO. Other variations are possible in accordance with the disclosed principles of this application.

TABLE 1

| USER | MEDIA SERVICE | # COMPUTERS | # TABLETS | # SMARTPHONES | # TELEVISION | # FLOATING |
|---|---|---|---|---|---|---|
| User 1 | M-GO | 1 | 1 | 2 | 1 | 1 |
| User 1 | NETFLIX | 1 | 1 | 1 | 1 | 2 |
| User 2 | M-GO | 2 | 1 | 1 | 2 | 1 |
| User 2 | AMAZON | 1 | 3 | 2 | 2 | 0 |

Figure 2:
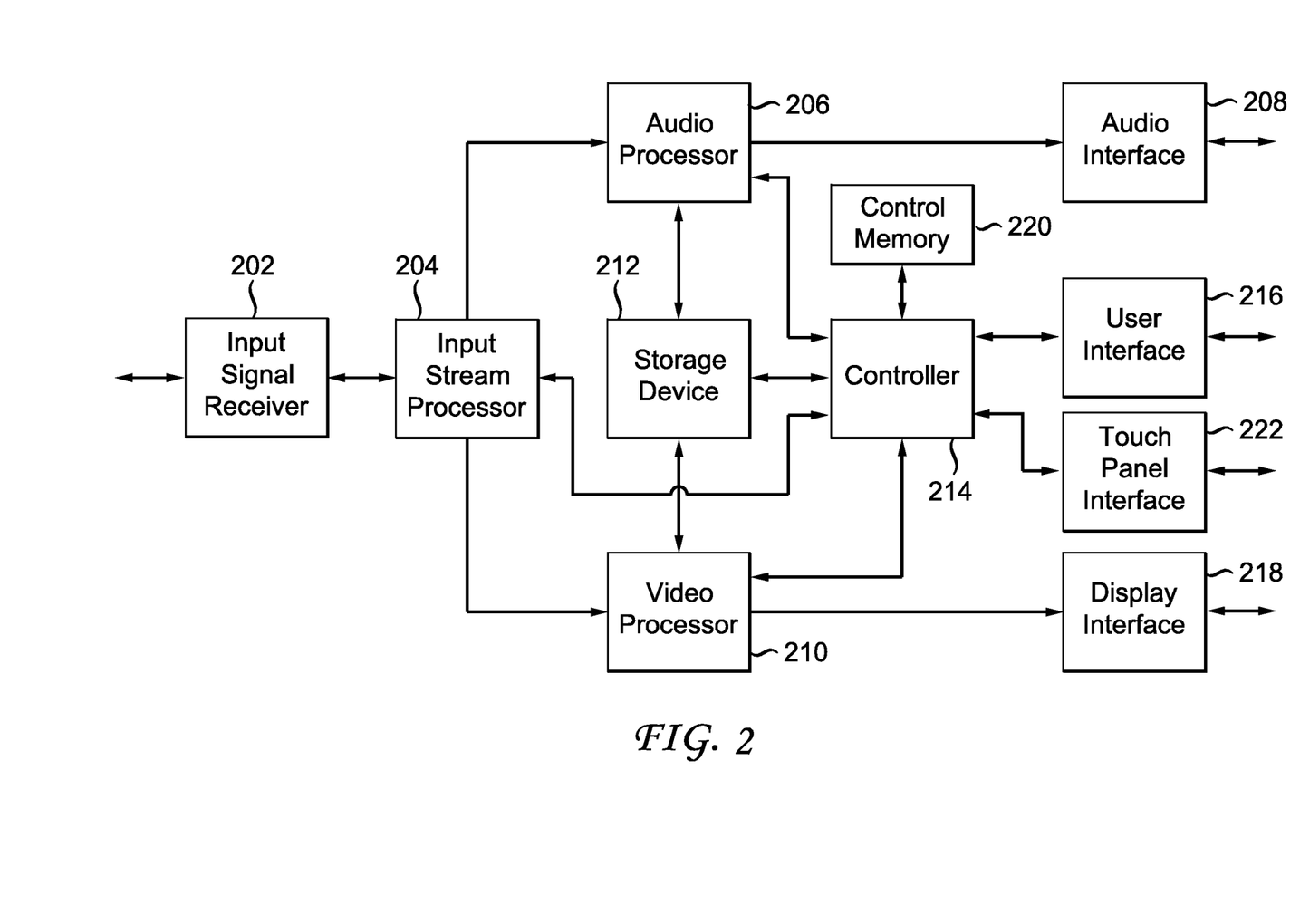
FIG. 2 is a block diagram of an exemplary media device in accordance with the present disclosure.

Turning now to FIG. 2, a block diagram of an embodiment of a media device 200 is shown. Receiving device 200 may operate similar to the media device described in FIG. 1 and may be included as part of a gateway device, modem, set-top box, tablet, or other similar communications device. The device 200 shown may also be incorporated into other systems including an audio device or a display device. In either case, several components necessary for complete operation of the system are not shown in the interest of conciseness, as they are well known to those skilled in the art.

In the device 200 shown in FIG. 2, the content is received by an input signal receiver 202. The input signal receiver 202 may be one of several known receiver circuits used for receiving, demodulation, and decoding signals provided over one of the several possible networks including over the air, cable, satellite, Ethernet, fiber and phone line networks. The desired input signal may be selected and retrieved by the input signal receiver 202 based on user input provided through a control interface or touch panel interface 222. Touch panel interface 222 may include an interface for a touch screen device. Touch panel interface 222 may also be adapted to interface to a cellular phone, a tablet, a mouse, a high end remote or the like.

The decoded output signal is provided to an input stream processor 204. The input stream processor 204 performs the final signal selection and processing, and includes separation of video content from audio content for the content stream. The audio content is provided to an audio processor 206 for conversion from the received format, such as compressed digital signal, to an analog waveform signal. The analog waveform signal is provided to an audio interface 208 and further to the display device or audio amplifier. Alternatively, the audio interface 208 may provide a digital signal to an audio output device or display device using a High-Definition Multimedia Interface (HDMI) cable or alternate audio interface such as via a Sony/Philips Digital Interconnect Format (SPDIF). The audio interface may also include amplifiers for driving one more sets of speakers. The audio processor 206 also performs any necessary conversion for the storage of the audio signals.

The video output from the input stream processor 204 is provided to a video processor 210. The video signal may be one of several formats. The video processor 210 provides, as necessary a conversion of the video content, based on the input signal format. The video processor 210 also performs any necessary conversion for the storage of the video signals.

A storage device 212 stores audio and video content received at the input. The storage device 212 allows later retrieval and playback of the content under the control of a controller 214 and also based on commands, e.g., navigation instructions such as fast-forward (FF) and rewind (Rew), received from a user interface 216 and/or touch panel interface 222. The storage device 212 may be a hard disk drive, one or more large capacity integrated electronic memories, such as static RAM (SRAM), or dynamic RAM (DRAM), or may be an interchangeable optical disk storage system such as a compact disk (CD) drive or digital video disk (DVD) drive.

The converted video signal, from the video processor 210, either originating from the input or from the storage device 212, is provided to the display interface 218. The display interface 218 further provides the display signal to a display device of the type described above. The display interface 218 may be an analog signal interface such as red-green-blue (RGB) or may be a digital interface such as HDMI. It is to be appreciated that the display interface 218 will generate the various screens for presenting the search results in a three dimensional gird as will be described in more detail below.

The controller 214 is interconnected via a bus to several of the components of the device 200, including the input stream processor 202, audio processor 206, video processor 210, storage device 212, and a user interface 216. The controller 214 manages the conversion process for converting the input stream signal into a signal for storage on the storage device or for display. The controller 214 also manages the retrieval and playback of stored content. Furthermore, as will be described below, the controller 214 performs searching of content and the creation and adjusting of the gird display representing the content, either stored or to be delivered via the delivery networks, described above.

The controller 214 is further coupled to control memory 220 (e.g., volatile or non-volatile memory, including RAM, SRAM, DRAM, ROM, programmable ROM (PROM), flash memory, electronically programmable ROM (EPROM), electronically erasable programmable ROM (EEPROM), etc.) for storing information and instruction code for controller 214. Control memory 220 may store instructions for controller 214. Control memory may also store a database of elements, such as graphic elements containing content, various graphic elements used for generating a displayed user interface for display interface 218, and the like. Alternatively, the memory may store the graphic elements in identified or grouped memory locations and use an access or location table to identify the memory locations for the various portions of information related to the graphic elements. In addition, various graphic elements can be generated in response to computer instructions interpreted by controller 214 for output to display interface 218. Additional details related to the storage of the graphic elements will be described below. Further, the implementation of the control memory 220 may include several possible embodiments, such as a single memory device or, alternatively, more than one memory circuit communicatively connected or coupled together to form a shared or common memory. Still further, the memory may be included with other circuitry, such as portions of bus communications circuitry, in a larger circuit.

Optionally, controller 214 can be adapted to extract metadata from audio and video media by using audio processor 206 and video processor 210, respectively. That is, metadata that is contained in video signal in the vertical blanking interval, auxiliary data fields associated with video, or in other areas in the video signal can be harvested by using the video processor 210 with controller 214 as to generate metadata that can be used for functions such as generating an electronic program guide, have descriptive information about received video, supporting an auxiliary information service, and the like. Similarly, the audio processor 206 working with controller 214 can be adapted to recognize audio watermarks that may be in an audio signal. Such audio watermarks can then be used to perform some action such as the recognition of the audio signal, security which identifies the source of an audio signal, or perform some other service. Furthermore, metadata to support the actions listed above can come from a network source which are processed by controller 214.

Figure 3:
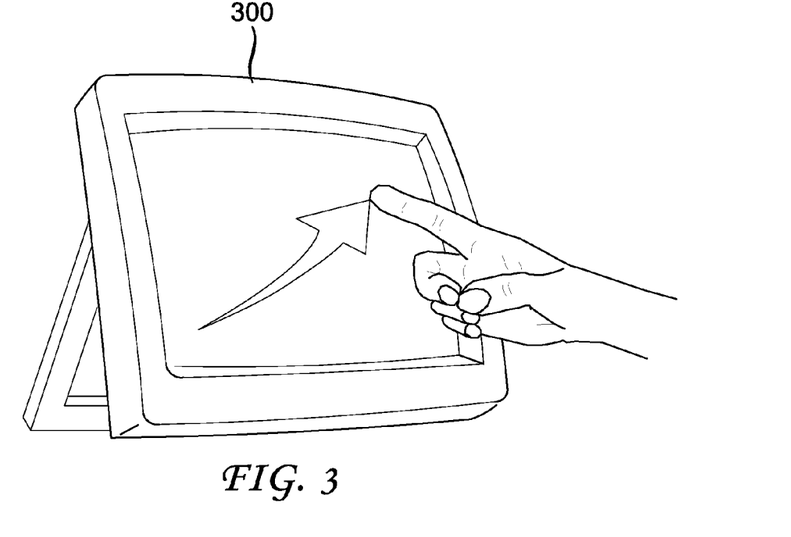
FIG. 3 is a perspective view of an exemplary display device in accordance with an embodiment of the present disclosure.

Turning now to FIG. 3, the user interface process of the present disclosure employs an input device that can be used to express functions, such as fast forward, rewind, etc. To allow for this, a tablet or touch panel device 300 (which is the same as the touch screen device 116 shown in FIG. 1 and/or is an integrated example of media device 108 and touch screen device 116) may be interfaced via the user interface 216 and/or touch panel interface 222 of the receiving device 200. The touch panel device 300 allows operation of the receiving device or set top box based on hand movements, or gestures, and actions translated through the panel into commands for the set top box or other control device. In one embodiment, the touch panel 300 may simply serve as a navigational tool to navigate the grid display. In other embodiments, the touch panel 300 will additionally serve as the display device allowing the user to more directly interact with the navigation through the grid display of content. The touch panel device may be included as part of a remote control device containing more conventional control functions such as activator buttons. The touch panel 300 can also includes at least one camera element. As described in further detail below, content displayed on the touch panel device 300 may be zapped or thrown to the main screen (e.g., display device 114 shown in FIG. 1).

Figure 4:
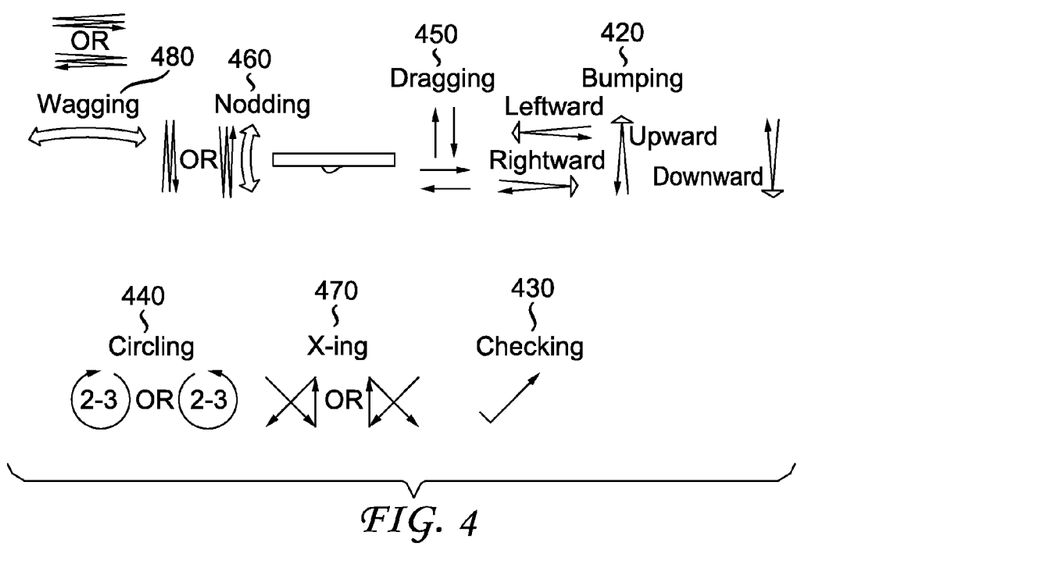
FIG. 4 illustrates an exemplary embodiment of the use of a gestures for a sensing controller or touch screen in accordance with the present disclosure.

Turning now to FIG. 4, the use of a gesture sensing controller or touch screen, such as shown, provides for a number of types of user interaction. The inputs from the controller are used to define gestures and the gestures, in turn, define specific contextual commands. The configuration of the sensors may permit defining movement of a user's fingers on a touch screen or may even permit defining the movement of the controller itself in either one dimension or two dimensions. Two-dimensional motion, such as a diagonal, and a combination of yaw, pitch and roll can be used to define any four-dimensional motion, such as a swing. A number of gestures are illustrated in FIG. 4. Gestures are interpreted in context and are identified by defined movements made by the user.

Bumping 420 is defined by a two-stroke drawing indicating pointing in one direction, either up, down, left or right. The bumping gesture is associated with specific commands in context. For example, in a TimeShifting mode, a left-bump gesture 420 indicates rewinding, and a right-bump gesture indicates fast-forwarding. In other contexts, a bump gesture 420 is interpreted to increment a particular value in the direction designated by the bump. Checking 440 is defined as in drawing a checkmark. It is similar to a downward bump gesture 420. Checking is identified in context to designate a reminder, user tag or to select an item or element. Circling 440 is defined as drawing a circle in either direction. It is possible that both directions could be distinguished. However, to avoid confusion, a circle is identified as a single command regardless of direction. Dragging 450 is defined as an angular movement of the controller (a change in pitch and/or yaw) while pressing a button (virtual or physical) on the tablet 300 (i.e., a "trigger drag"). The dragging gesture 450 may be used for navigation, speed, distance, time-shifting, rewinding, and forwarding. Dragging 450 can be used to move a cursor, a virtual cursor, or a change of state, such as highlighting outlining or selecting on the display. Dragging 450 can be in any direction and is generally used to navigate in two dimensions. However, in certain interfaces, it is preferred to modify the response to the dragging command. For example, in some interfaces, operation in one dimension or direction is favored with respect to other dimensions or directions depending upon the position of the virtual cursor or the direction of movement. Nodding 460 is defined by two fast trigger-drag up-and-down vertical movements. Nodding 460 is used to indicate "Yes" or "Accept." X-ing 470 is defined as in drawing the letter "X." X-ing 470 is used for "Delete" or "Block" commands. Wagging 480 is defined by two trigger-drag fast back-and-forth horizontal movements. The wagging gesture 480 is used to indicate "No" or "Cancel."

Depending on the complexity of the sensor system, only simple one dimensional motion or gestures may be allowed. For instance, a simple right or left movement on the sensor as shown here may produce a fast forward or rewind function. In addition, multiple sensors could be included and placed at different locations on the touch screen. For instance, a horizontal sensor for left and right movement may be placed in one spot and used for volume up and down, while a vertical sensor for up down movement may be place in a different spot and used for channel up and down. In this way specific gesture mappings may be used. A two finger swipe gesture may be utilized to initiate the throwing or moving of content from the tablet 300 to the main screen or display device 114.

Figure 5:
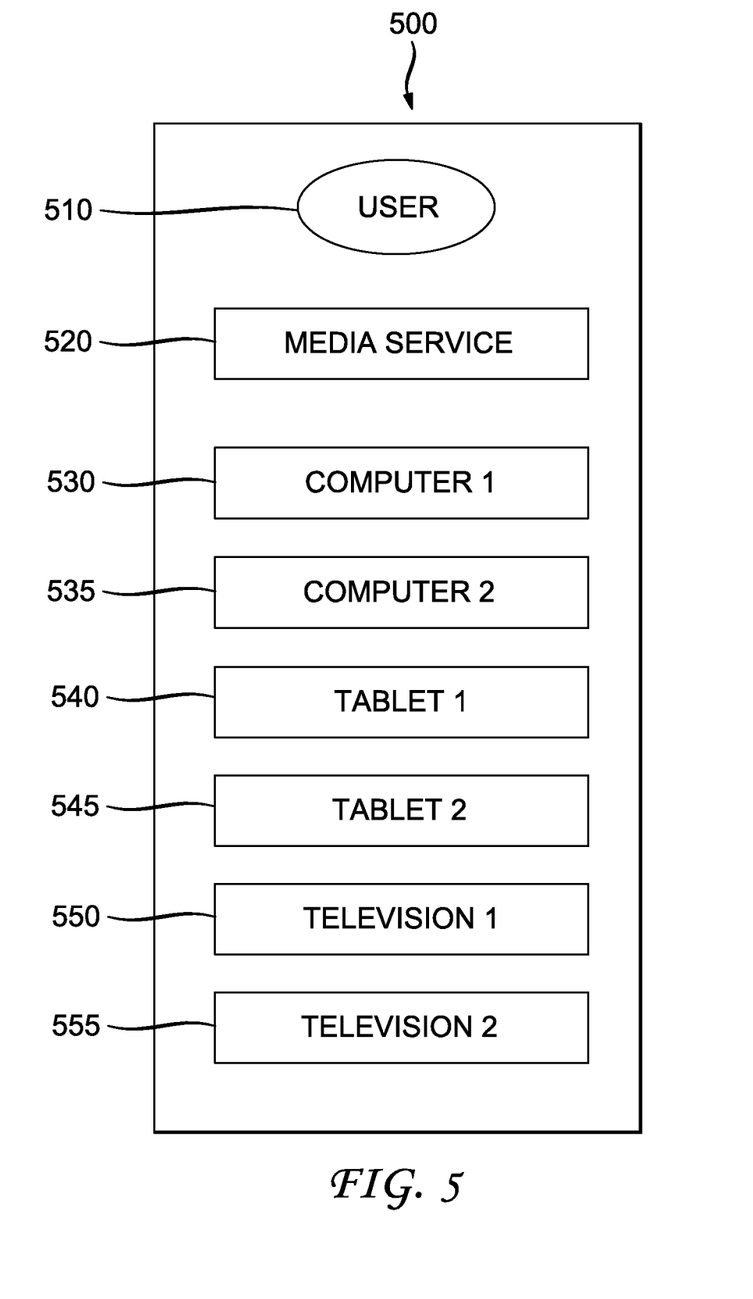
FIGS. 5-11 illustrate exemplary embodiments of a user interface that is used to assign devices of different types to a media service.

FIG. 5 is an exemplary embodiment of user interface 500 that can be used to assign different devices to a media service. User interface 500 can be generated on a display device, a touchscreen, tablet, phone, and other device with a display, and the like.) A representation of a user 510 is shown in the user interface where such a representation can be used to distinguish between different users and to identify a user account currently being used. Media server 520 represents a media service for which different devices can be assigned by using user interface 500. Different device type representations such as computer (530, 535), tablet (540, 545), and television (550, 555) represent different devices and different device types that are controlled by user 510. By using user interface 500 in a manner such as having a user drag a representation of a device to media service 520, the user will end up assigning the device corresponding to a device representation to media service 520 such that the user account 510 and access privileges will be associated with such a media service. Hence, a user would be able to use media service 520 on an associated device after such a representation is made. Associations can be made by binding an IP address, Media Access Control, hardware address, and the like of a device to media service 520 whereby such an association is made in the access privilege information corresponding to a media service 520.

Figure 6:
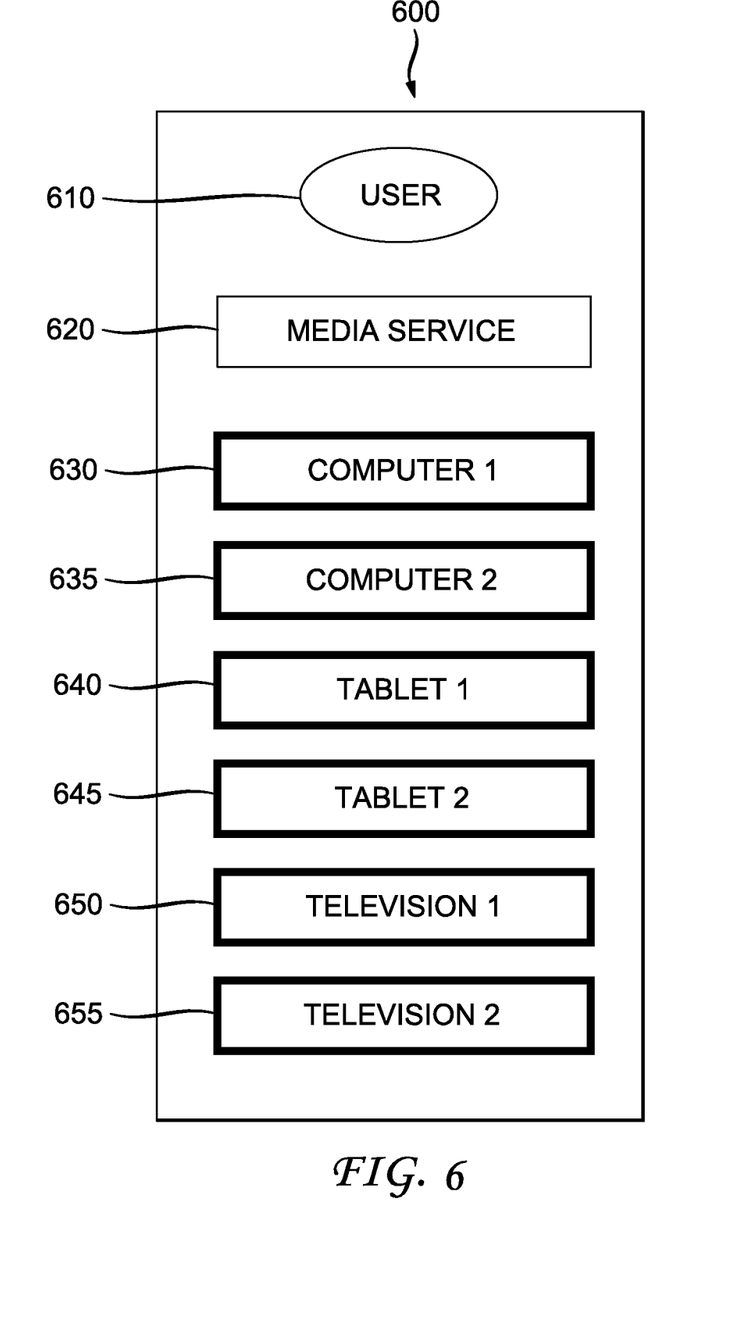

FIG. 6 is an exemplary embodiment of a user interface 600 that indicates all of the devices and device types that can be associated with a media service 620. In the present example, the access privilege information (see TABLE 1 for User 1 using M-GO) for user 610 designates that a user can assign one computer device type (either computer 630 or computer 635) to media service 620, one tablet device type (either tablet 640 or tablet 645), and one television device type (television 650 or 655) to media service 620. Such indications of what devices can be assigned to media service 620 are given in this exemplary embodiment by bolding the outlines of the device representation, although other indications can be made by presenting device representations in different colors, shading, rendering borders differently, animating a device representation, and the like.

Figure 7:
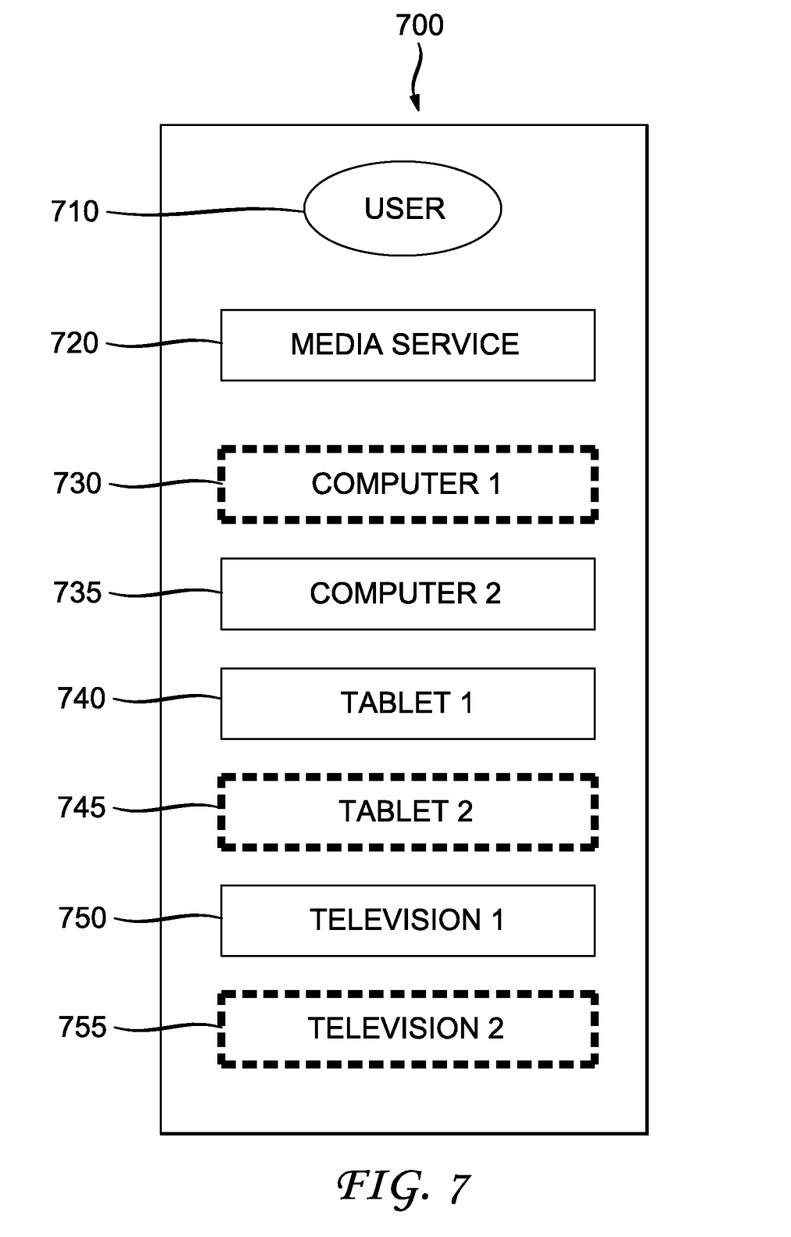

FIG. 7 is an exemplary embodiment of a user interface 700 where different device types are assigned to a media service 720 in accordance with access privilege information corresponding to user 710. In this example where all of the device types had a limit of one, media service 720 is assigned to computer 730, tablet 745, and television 755, where such assignments are shown by the broken outlines of the corresponding device representations. Hence, if a user attempted to access media service 720 using computer 730, the user would be able to playback content received from media service 720 because of the assignment. Alternatively, if a user attempted to access media service 720 using 735, the user would not be able to playback content from media service 720 because only one computer device type can be assigned to media service 720 at a time in accordance with the access privilege information. Likewise, media service 720 can be accessed using tablet 745 and television 755, while tablet 740 and television 750 cannot be used to access media service 720 unless user interface 700 is used to change device type associations in accordance with the exemplary principles.

Figure 8:
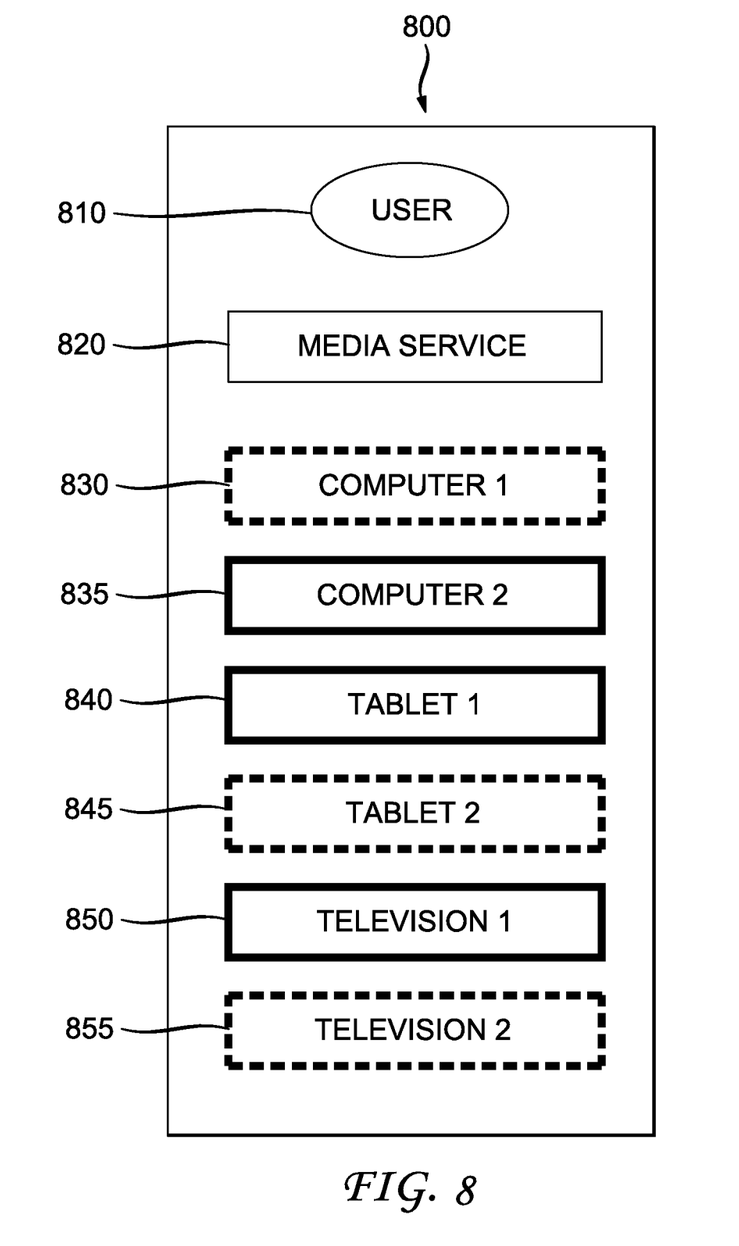

FIG. 8 is an exemplary embodiment of user interface 800 in which a floating assignment can be made to different devices regardless of the type of device. In the present example, computer 830, tablet 845, and television 855 have already been assigned to media service 820. A floating assignment, as previously described, is an assignment that can be made to media service 820 for a device without a limitation as to the device type of such a device (see TABLE 1 for User 1 using M-GO), where in the present case a there is one floating assignment option. Hence, computer 835, tablet 840, and television 850 represent devices that can make use of the floating assignment option as to assign one of these unassigned devices to media service 820.

Figure 9:
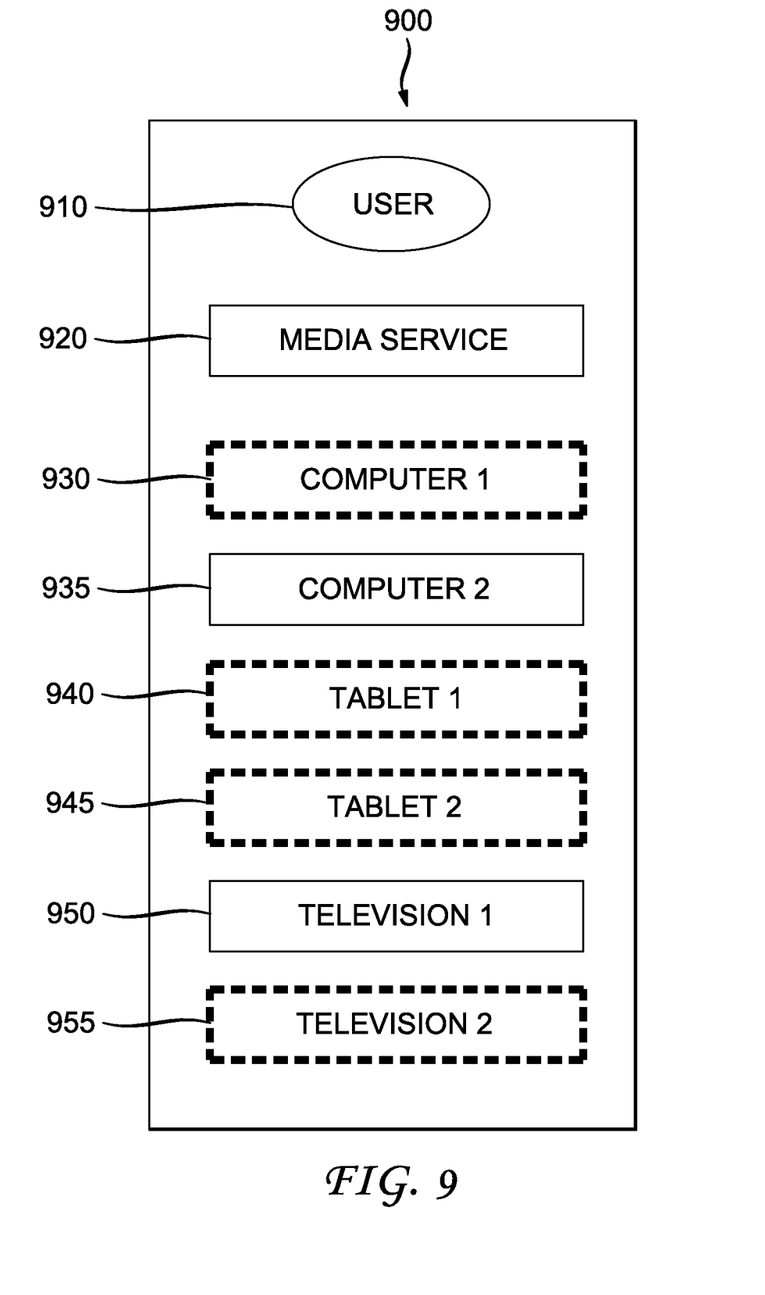
Figure 10:
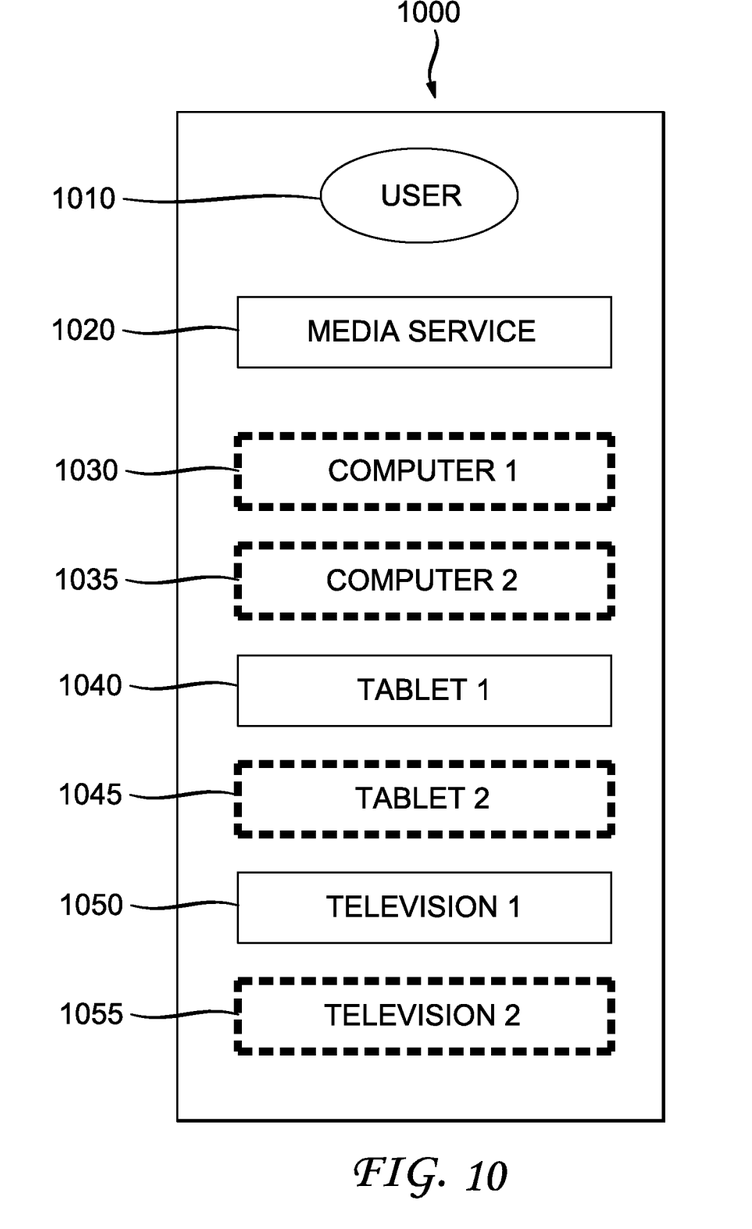

FIG. 9 is an exemplary embodiment of user interface 900 in which the floating assignment is used to assign a tablet 940 to media service 920. After the floating assignment is utilized in this exemplary illustration, computer 935 and television 950 are then presented as normal whereby the corresponding devices are unable or blocked from accessing media service 920. FIG. 10, as an exemplary embodiment of user interface 1000, has computer 1035 as the device that is associated with media service 1020, while table 1040 and television 1050 are rendered in a normal format whereby the corresponding devices are unable or blocked from accessing media service 1020. Other examples are possible in accordance with the presented illustrative principles.

Figure 11:
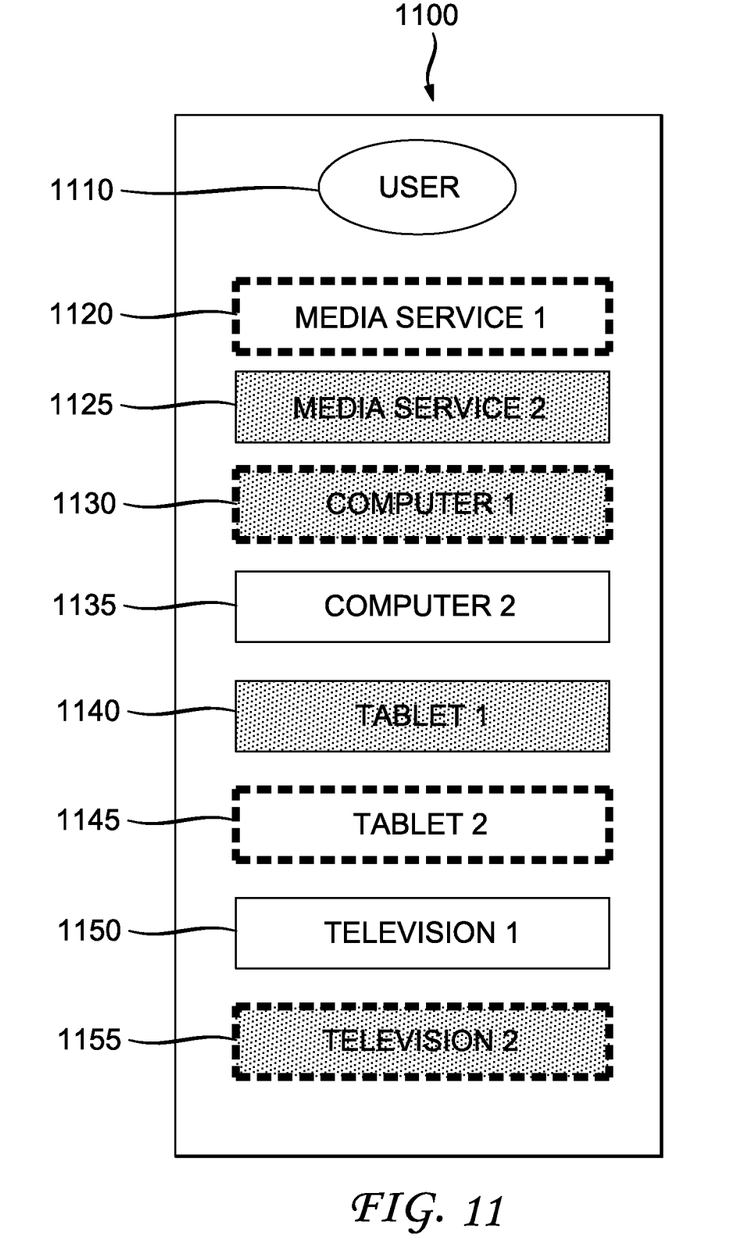

FIG. 11 is an illustrative example of a user interface 1100 that presents the assignment of two media services (1120, 1125) to different devices. In the present example, devices assigned to media service 1120 have a broken outline while devices assigned to media service 1125 are shaded. Computer 1130 is assigned to both media services 1120 and 1125, while tablet 1140 is assigned to media service 1125 and tablet 1145 is assigned to tablet 1145. Television 1155 is assigned to media services 1120 and 1125. Computer 1135 and television 1150 are not assigned to any media service.

Other assignment of devices, different device types, and media services are possible in accordance with the presented illustrative principles.

Figure 12:
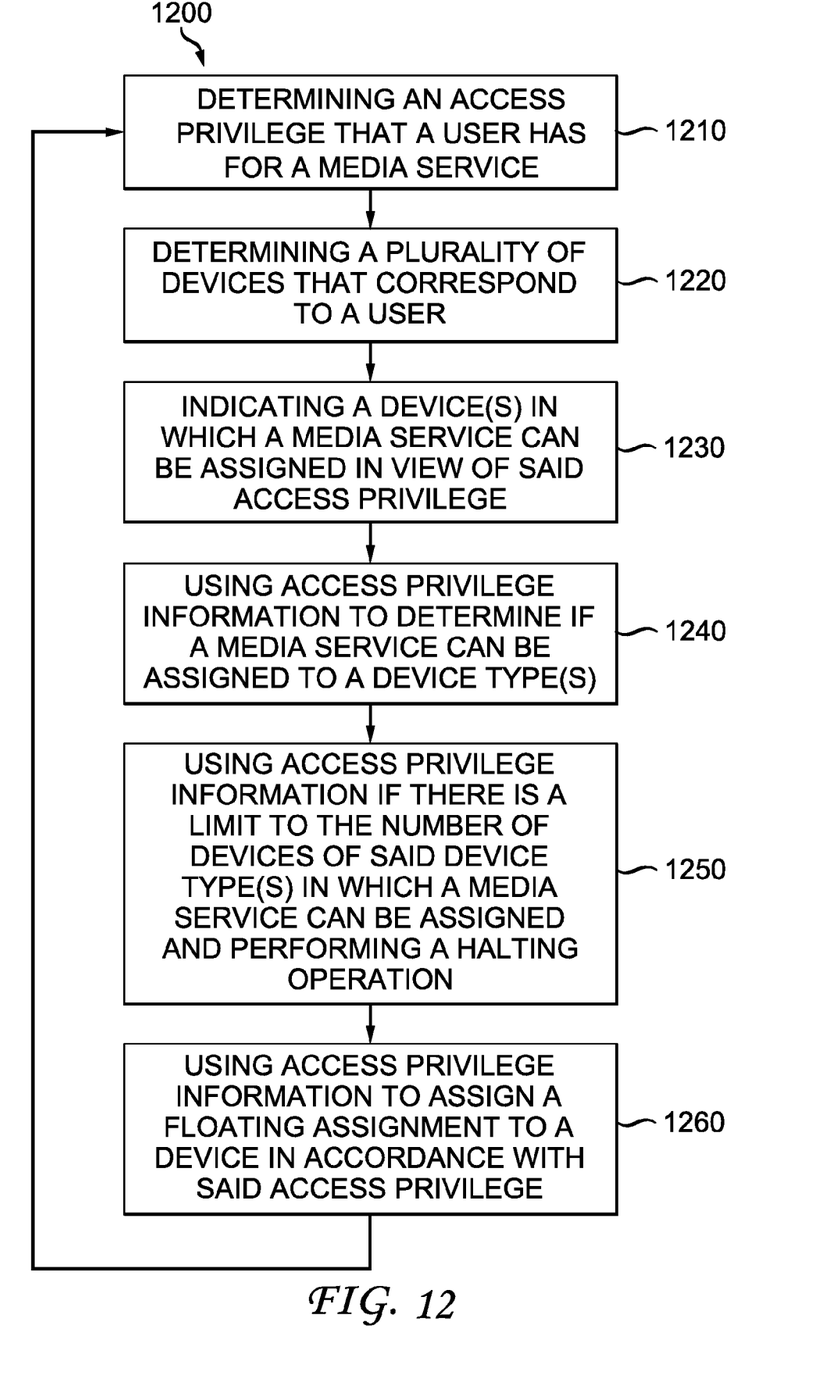
FIG. 12 illustrates an exemplary embodiment of a flowchart for assigning devices of different types to a media service.

FIG. 12 is a flowchart of a method 1200 that can be used to assign media services to different devices and device types. In step 1210, a determination is made for a user that establishes the access privileges that the user has for a media service. Specifically, as shown in TABLE 1 above, a media service for a particular user account will have a number of device types in which a user can assign a media service which can represented in access privilege information. Following method steps use such information to determine what device types, how many of such device types, how many floating assignments, and the like can be assigned to a media service.

In step 1220, a determination is made to find out what devices correspond to a user. Such a determination can be made by using device discovery techniques such as Universal Plug and Play (UPnP), using HDMI to determine devices that are connected in a home network/cables, IP device lookups, Media Access Control device lookups, Hardware Lookups, user entered in information that indicates what devices are assigned to a user, and the like. Other approaches can be used for this step in accordance with the illustrative principles described herein.

Step 1230 has a user interface generated where there is an indication of the devices for which a media service can be assigned. Illustrative examples of such user interfaces are shown in FIGS. 5-11. In step 1240, access privilege information is used to determine if a media service can be assigned to a device of a specific device type. The access privilege information, as described above, sets for the number of devices types in which a media service can be assigned whereby such information can be shown in the various illustrative user interfaces. The assignment of a device to a media service can be performed in response to a user instruction whereby such an assignment can be stored in a license server 160 and the media service can be played and controlled by the assigned device.

Access privilege information is checked in step 1250 to determine if the number of devices of a specific type in which a media service has been assigned has been reached. If such a limit is reached, the assignment of additional devices of such a type to the media service is halted so that the playback and control of the media service is not possible through these additional devices. A device can be unassigned from a media service which would then free another device to be assigned to the media service in accordance with the principles of step 1250. In step 1260, a floating assignment is used to assign a device to the media service regardless of device type. The steps of method 1200 can be repeated to assign additional media services (first, second, third, fourth, etc.) and additional device types (first, second, third, fourth, etc.) in accordance with the described principles.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes that can be substantially represented in computer readable media and so executed by a computer or processor, whether or not such computer or processor is explicitly shown. The computer readable media and code written on can be implemented in a transitory state (signal) and a non-transitory state (e.g., on a tangible medium such as CD-ROM, DVD, Blu-Ray, Hard Drive, flash card, or other type of tangible storage medium).

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. It is noted that modifications and variations can be made by persons skilled in the art in light of the above teachings.

The invention claimed is:

1. A method for using a media service by a plurality of devices comprising:
   determining an access privilege that a user has for the media service, wherein the access privilege comprising a device type restriction account and a floating account, the device type restriction account restricts access privileges for the plurality of devices by device type and the floating account does not restrict access privileges for the plurality of devices by device type;
   determining one or more of the plurality of devices that correspond to each of the device type restriction account and the floating account of the user; and
   providing a user interface indicating said one or more of said plurality of devices being assigned to the device type restriction account and the floating account for accessing the media service in view of said access privilege.

2. The method of claim 1 additionally comprising:
   assigning said one or more of said plurality of devices to said media service in response to a user input.

3. The method of claim 2 wherein said assigning is a binding of said one or more of said plurality of devices to said media service by using at least one of a: media access control, hardware address, and an internet protocol address corresponding to each of said one or more of said plurality of devices.

4. The method of claim 2 where said assigning is halted when a number of devices are assigned and said number is set by said access privilege.

5. The method of claim 2 wherein said assigning is temporary for a guest account and said temporary status is authorized by said access privilege.

6. The method of claim 1 where said one or more of said plurality of devices is of a first device type and said access privilege provides only the assignment of said media service to said first device type.

7. The method of claim 1 additionally comprising:
   determining at least one device from said plurality of devices is at least one device of a first device type;
   determining an additional at least one device from said plurality of devices is at least one device of a second device type, where first device type and second device type are different; and
   indicating how many of a first number of said at least one device of said first device type and how many of a second number of said at least one device from said second device type can be assigned to said media service in view of said access privilege.

8. The method of claim 7 wherein said access privilege defines said first number of said devices of first type and said second number of said devices of second type.

9. The method of claim 8 additionally comprising:
   assigning to said at least one device up to said first number of devices of said first device type to said media service; and
   assigning to said additional at least one device up to said second number of devices of said second device type to said media service.

10. The method of claim 9 additionally comprising:
    halting the assigning of said media service to said at least one device when said first number is exceeded; and
    halting the assigning of said media service to said additional at least one device when said second number is exceeded.

11. The method of claim 9 additionally comprising:
    determining a second access privilege that a user has for a second media service;
    indicating said at least one device from said plurality of devices in which said second media service can be assigned in view of said second access privilege; and
    indicating said additional at least one device from said plurality of device in which said second media service can be assigned in view of said second access privilege.

12. The method of claim 11 additionally comprising:
assigning to said at least one device up to a third number of devices of said first device type to said second media service and said additional at least one device up to a fourth number of device of said second type to said media service.

13. The method of claim 12 wherein said second access privilege defines said third number of said devices of first type and said fourth number of said devices of second type.

14. The method of claim 12 wherein said assigning is binding of said at least one device or said additional at least one device to said second media service.

15. An apparatus comprising:
a processor; and
a memory storing instructions, when executed by said processor, causes the apparatus to:
determine an access privilege that a user has for a media service, wherein the access privilege comprising a device type restriction account and a floating account, the device type restriction account is restricted by device type and the floating account is not restricted by device type;
determine one or more of a plurality of devices that correspond to each of the device type restriction account and the floating account of the user; and
providing a user interface indicating said one or more of said plurality of devices being assigned to the device type restriction account and the floating account for accessing the media service in view of said access privilege.

16. The apparatus of claim 15 comprising an additional instruction when executed by the processor causes the apparatus to assign said one or more of said plurality of devices to said media service in response to a user input.

17. The apparatus of claim 16 wherein said assigning is a binding of said one or more of said plurality of devices to said media service by using at least one of a: media access control, hardware address, and an internet protocol address corresponding to each of said one or more of said plurality of devices.

18. The apparatus of claim 16 where said assigning is halted when a number of devices are assigned and said number is set by said access privilege.

19. The apparatus of claim 16 wherein said assigning is temporary for a guest account and said temporary status is authorized by said access privilege.

20. The apparatus of claim 15 where said one or more of said plurality of devices is of a first device type and said access privilege provides only the assignment of said media service to said first device type.

21. The apparatus of claim 15 additionally comprising instructions, when executed by said processor, causes said apparatus:
to determine at least one device from said plurality of devices is at least one device of a first device type;
to determine an additional at least one device from said plurality of devices is at least one device of a second device type, where first device type and second device type are different; and
to indicate how many of a first number of said at least one device of said first device type and how many of a second number of said at least one device from said second device type can be assigned to said media service in view of said access privilege.

22. The apparatus of claim 21 wherein said access privilege defines said first number of said devices of first type and said second number of said devices of second type.

23. The apparatus of claim 22 additionally comprising instructions, when executed by said processor, causes said apparatus:
to assign said at least one device up to said first number of devices of said first device type to said media service; and
to assign to said additional at least one device up to said second number of devices of said second device type to said media service.

24. The apparatus of claim 23 additionally comprising instructions, when executed by said processor, causes said apparatus:
halting the assigning of said media service to said at least one device when said first number is exceeded; and
halting the assigning of said media service to said additional at least one device when said second number is exceeded.

25. The apparatus of claim 23 additionally comprising instructions, when executed by said processor, causes said apparatus:
to determine a second access privilege that a user has for a second media service;
to indicate said at least one device from said plurality of devices in which said second media service can be assigned in view of said second access privilege; and
to indicate said additional at least one device from said plurality of device in which second media service can be assigned in view of said second access privilege.

26. The apparatus of claim 25 additionally comprising instructions, when executed by said processor, causes said apparatus:
to assign to said at least one device up to a third number of devices of said first device type to said second media service and said additional at least one device up to a fourth number of device of said second type to said media service.

27. The apparatus of claim 26 wherein said second access privilege defines said third number of said devices of first type and said fourth number of said devices of second type.

28. The apparatus of claim 26 wherein said assigning is binding of said at least one device or said additional at least one device to said second media service.

* * * * *